(12) United States Patent
Rouse et al.

(10) Patent No.: US 12,726,831 B1
(45) Date of Patent: Sep. 1, 2026

(54) LOCATION BASED SUBSCRIBER IDENTITY MODULE (SIM) SWITCHING

(71) Applicant: Relay, Inc., Raleigh, NC (US)

(72) Inventors: Alex Rouse, Cary, NC (US); Dayne Batten, Cary, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 19/277,645

(22) Filed: Jul. 23, 2025

(51) Int. Cl.
*H04W 36/32* (2009.01)
*H04W 16/18* (2009.01)

(52) U.S. Cl.
CPC ......... *H04W 16/18* (2013.01); *H04W 36/322* (2023.05)

(58) Field of Classification Search
CPC .............................. H04W 16/18; H04W 36/32
See application file for complete search history.

(56) References Cited

U.S. PATENT DOCUMENTS 6,871,077 B2 * 3/2005 Kennedy, Jr. ......... H04W 64/00 342/463
2023/0128527 A1 * 4/2023 Teshome ................. H04L 67/30 709/224
2023/0328538 A1 * 10/2023 Kappes ................. H04W 16/24
2023/0388742 A1 * 11/2023 Turpin ........... G06Q 10/063114

* cited by examiner

*Primary Examiner* — Michael T Vu
(74) *Attorney, Agent, or Firm* — Gregory Stephens

(57) ABSTRACT

An embodiment is directed to dynamic subscriber identity module (SIM) switching based on a location heatmap. In an example, a method includes obtaining, at a portable communication device (PCD), a heatmap comprising historical cellular network connectivity data for a plurality of positions in a location; determining, by the PCD, a current position in the location; and indicating, at the PCD, cellular network connectivity data based on the current position and the heatmap.

20 Claims, 6 Drawing Sheets

LOCATION BASED SUBSCRIBER IDENTITY MODULE (SIM) SWITCHING

BACKGROUND

1. Field

The disclosed subject matter generally pertains to using location of portable communication devices (PCDs) to ensure or improve communication connectivity based on network mapping.

2. Description of the Related Art

The Relay® device by Relay, Inc. is an example of a handheld portable communication device (PCD) that provides voice communication with other Relay® devices, similar to a walkie-talkie. One embodiment of a Relay® device uses a voice interface while other embodiments may include a limited small screen primarily used to convey device diagnostic information such as, for instance, battery status, signal strength, channel information, time, etc. The Relay® device can use a wireless Internet Protocol (IP) communication link rather than a conventional circuit switched communication link to exchange voice messages and data with a communication platform server (CPS). The CPS manages voice messages and data among various endpoints. The communication device(s) may wirelessly connect to an IP network over one or more wireless IP interfaces and communication links. The IP communication link may use one or more of the Wi-Fi channels and protocols, such as the 802.11 family, or may use one of the many cellular IP air interfaces and over-the-air RF protocols.

SUMMARY

Conventionally, a portable communication device (PCD) may operate using Wi-Fi to form a communication link via an access point and the Internet. If the Wi-Fi connection is not available or becomes unreliable, a PCD may switch to a cellular network for connectivity using a cellular transceiver and a subscriber identification module (SIM) of the PCD. A PCD may be a multi-SIM device that has more than one SIM (either a physical SIM card or an embedded e-SIM).

Although PCDs may operate using Wi-Fi or cellular network connections, switching between cellular networks may be unsatisfactory or suboptimal. For example, there is no optimal mechanism for informing a PCD of available cellular networks and facilitating a switch, particularly changing cellular connections in a proactive manner to ensure the best signal and connectivity.

An embodiment provides a PCD with the ability to use smart, dynamic switching of SIMs. In an embodiment, PCDs include multiple SIMs for cellular connectivity in addition to supporting other types of connectivity, as described herein. In an embodiment, PCDs leverage multiple cellular carriers (MNOs) and/or mobile virtual network enablers (MVNEs) simultaneously. An embodiment provides a heatmap to a PCD that is specific for the current location of the PCD, e.g., an indoor area in which the PCD is currently operating. The heatmap is constructed, for example, based on historical reporting from PCDs in the location. The heatmap comprises cellular network connectivity data for the location, for example connectivity strength or quality in areas of the location, such as in areas of a floor of a building. As each PCD may determine its relative location in the area, it is able to determine its location in the heatmap data to permit automatic switching to a better cellular connection, which can be done proactively in some cases, such as when heatmap data is combined with heading or directional data.

In summary, an embodiment provides a method, comprising: obtaining, at a PCD, a heatmap comprising historical cellular network connectivity data for a plurality of positions in a location; determining, by the PCD, a current position in the location; and indicating, at the PCD, cellular network connectivity data based on the current position and the heatmap.

In an embodiment, the indicating cellular network connectivity data comprises recommending a switch to a cellular network based on the heatmap and the current position. In an embodiment, the indicating cellular network connectivity data comprises indicating a subscriber identification module (SIM) of the PCD to use for communicating data over a cellular network. In an embodiment, the PCD comprises a plurality of SIMs, each connecting to a different cellular network carrier and the method comprises switching between the plurality of SIMs based on the indicating cellular network connectivity data based on the current position and the heatmap.

In an embodiment, the method comprises determining a direction of movement of the PCD, where the switching is performed proactively based on the direction of movement.

In an embodiment, the PCD communicates by default using an access point to a wireless internet connection and the method comprises switching from the access point to the SIM based on the indicating cellular network connectivity data based on the current position and the heatmap.

In an embodiment the method comprises communicating, from the PCD to a communication platform server (CPS), cellular network connectivity data. In an embodiment, the communicating is performed as a background task.

In an embodiment, the indicating cellular network connectivity data based on the current position and the heatmap comprises providing a visual indication of cellular connectivity at the PCD.

In an embodiment, the heatmap comprises, for a plurality of sublocations at the location, a two-dimensional (2D) location indicator, an elevation indicator, a cellular carrier identification, and signal strength data.

An embodiment provides a system comprising components such as a SIM management program that implement one or more aspects or features of the various embodiments. In an embodiment, the system comprises a set of one or more processors and executable code stored in a non-transitory storage medium, the executable code being configurable for use by the set of one or more processors to perform one or more of the methods, or part thereof, as described herein.

An embodiment provides a computer program product comprising a non-transitory computer readable medium comprising code configurable to be executable by a set of one or more processors to perform one or more of the methods, or part thereof, as described herein.

The foregoing is a summary and thus may contain simplifications, generalizations, and omissions of detail; consequently, those skilled in the art will appreciate that the summary is illustrative only and is not intended to be in any way limiting.

These and other features and characteristics of the example embodiments, as well as the methods of operation and functions of the related elements of structure and the combination thereof, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of a claimed invention.

DETAILED DESCRIPTION OF EXAMPLE EMBODIMENTS

The described features, structures, or characteristics of the example embodiments may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well known structures, materials, or operations are not shown or described in detail to avoid obfuscation.

One example of a portable communication device (PCD) is the Relay® device offered by Relay, Inc. Such devices find use in, for example, facilitating voice communication among users keeping a respective PCD on their person. In a non-limiting example, a PCD provides a push-to-talk functionality, like conventional walkie-talkies for radio communications. PCDs require sophisticated communication capabilities, including customized, secure, and/or logical communication channels, for example a voice channel only connecting members of a given team.

In an embodiment, a PCD defaults to use Wi-Fi connectivity when it is available and sufficient but often-times cellular connections must be used. To facilitate timely communication connectivity, an embodiment provides smart, dynamic subscriber identity module (SIM) switching on a PCD. In an embodiment, the PCDs include multiple SIMs for cellular connectivity. In an embodiment, the PCDs can leverage multiple cellular carriers and/or mobile virtual network enablers (MVNEs), denoted as cellular carriers in this document, simultaneously. In an embodiment, a PCD is connected to and actively communicating using only one cellular carrier at a given point in time but more than one cellular carrier may be available allowing the PCD the opportunity to switch. In an embodiment, to provide the best connectivity experience for a fleet of PCDs, a best cellular carrier is found and used based on the location of a PCD.

The description now turns to the figures. The illustrated example embodiments will be best understood by reference to the figures. The following description is intended only by way of example and simply illustrates certain example embodiments.

Figure 1:
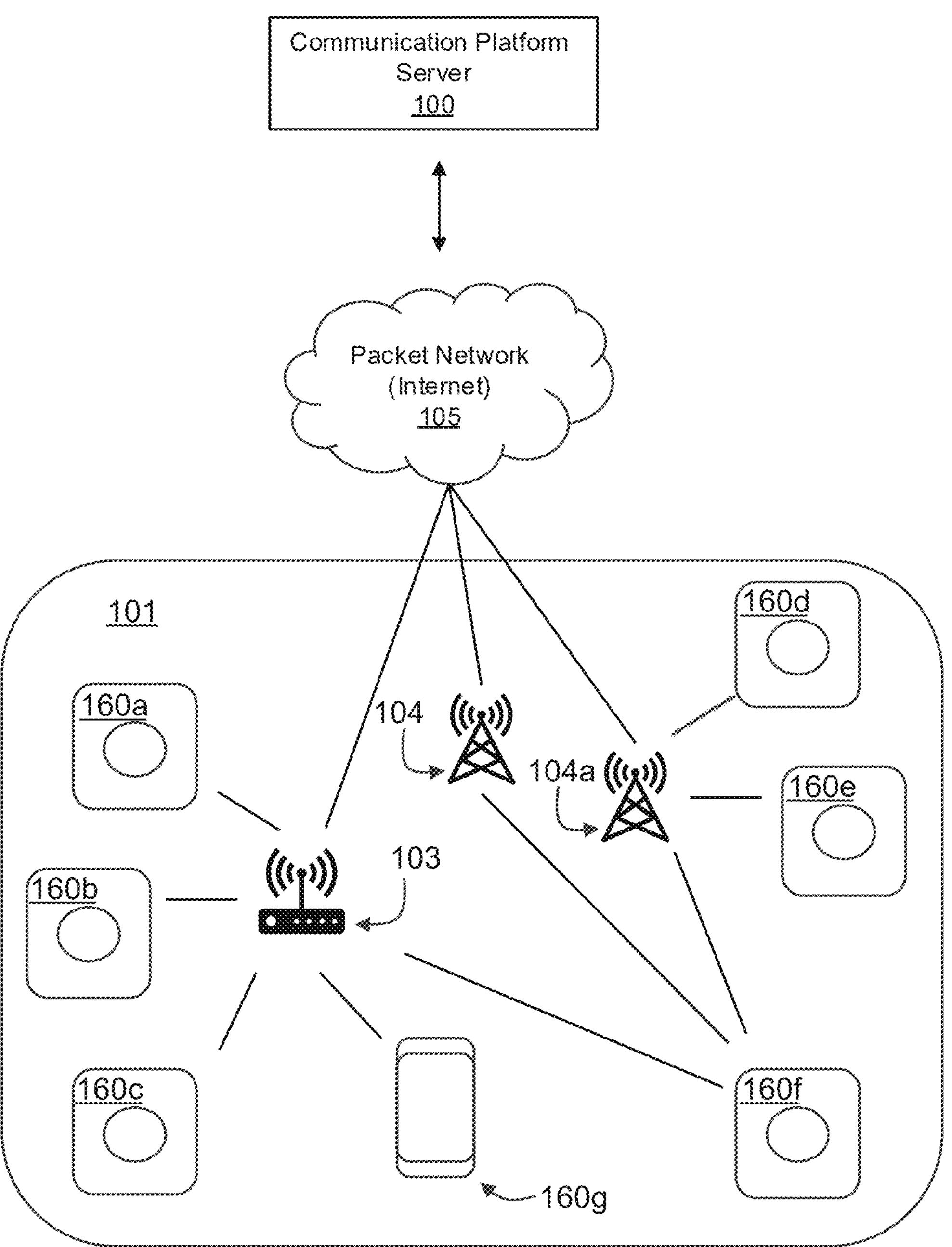
FIG. 1 illustrates a diagram of example system components according to an embodiment.

Illustrated in FIG. 1 is a system implemented in a network environment including communication platform server (CPS) 100 enabling a plurality of PCDs 160*a-g* to communicate with one another through message channels. Messages may be exchanged using wireless communication, with common examples including wireless push-to-talk (PTT) communication over a voice-based logical communication channel, where a logical channel is used to couple a smaller group of available PCDs. A logical communication channel is an abstraction of the physical communication channels used, such as a Wi-Fi, cellular, or Long Range (LoRa) physical communication channel. For PCDs 160*a-g*, messages may be managed by software running on a server such as CPS 100, for example providing a message queue, routing messages, or dynamically configuring a PCD. In addition, certain PCDs, such as PCD 160*g*, may be provided in a different form factor, such as a smartphone running a mobile app to provide access and functions to connect to other PCDs 160*a-f*, for example using PTT over cellular or Wi-Fi. In an embodiment PCDs 160*a-f* may be voice interface PCDs as described herein. In another embodiment, PCDs may have limited screen functionality compared to a smartphone.

In some example embodiments, PCDs 160*a-g* are configured to operate within an area 101, which may be geofenced. In an example functionality, communication outside area 101 may be restricted, either by design or area 101 has limited cellular or Wi-Fi connections. Connectivity may be through public or private network devices in range of area 101, for example Wi-Fi access point 103 and cellular access device 104 with coverage that includes all or a portion of area 101, providing access to CPS 100 via a broader packet network 105 such as the Internet via typical wireless carrier infrastructure. Note that the network provided may be private or public, or some combination thereof.

An aspect of certain PCDs, e.g., PCD 160*f*, is the ability to utilize or bond multiple concurrent IP packet data streams over different communication links. This provides redundancy and enhances reliability, especially when primary connections experience degradation. For example, PCD 160*f* can send data to CPS 100 or any other endpoint over a primary 802.11 Wi-Fi connection. Simultaneously and redundantly, PCD 160*f* can send the same data to CPS 100 via a different data channel, such as using a cellular network connection via cellular access device 104, via an intermediary device, e.g., a direct peer-to-peer connection (e.g., Bluetooth or cable), or a combination thereof. CPS 100 receives data from PCD 160*f* in redundant form via its data interfaces, which could include Wi-Fi, cellular, or alternative wireless networks. Thus, a "multi-streaming/bonding" approach may be used to increase communication quality, e.g., by selecting a best packet or replacing a lost packet via the redundant streams at CPS 100. In an embodiment, PCD 160*f* is equipped with a client side (and CPS 100 is equipped with a server side) of an IP multi-streaming (IPMS) logic program to manage sending, receiving, and intelligently coordinating the assembling of these multiple data streams into a single, high-quality stream.

In an embodiment, certain PCDs such as PCD 160*f* include an ability to operate using dual SIM technology, which may be part of an IPMS or bonding protocol. Thus, PCD 160*f* may activate more than one cellular-based communication link, e.g., with CPS 100, for example facilitated by multiple connections to different cellular access devices 104, 104*a*. In an embodiment, PCD 160*f* maintains multiple active connections with cellular access devices 104, 104*a*, while only transmitting data using one of the two or more active cellular-based communication links. In other words, PCD 160*f* may have a first cellular-based IP communication link active, e.g., via a first SIM connection with cellular access device 104, which may be used to communicate redundant data paired with a primary Wi-Fi IP communication link, facilitated via access point 103.

In an embodiment, PCD 160*f* includes an additional, second cellular-based IP communication link, e.g., via the first SIM or a second SIM connected to cellular access device 104*a*, which is active but not used in transmitting data unless a SIM switching routine is activated. For example, PCD 160*f* may register with cellular access device 104*a* but not actively communicate data using the active connection unless a SIM switch is triggered. As described herein, this permits PCD 160*f* to primarily use Wi-Fi when available, but to seamlessly switch to a first cellular-based IP communication link, e.g., when Wi-Fi is not available or degrades. Further, the second active cellular-based IP communication link may be promoted to a first or primary cellular-based communication link, e.g., where a heatmap indicates that the second active cellular-based IP communication link is or will become a better (e.g., stronger, higher quality, or some determinable parameter(s) used to promote or rank) connection to an endpoint such as CPS 100.

Figure 2:
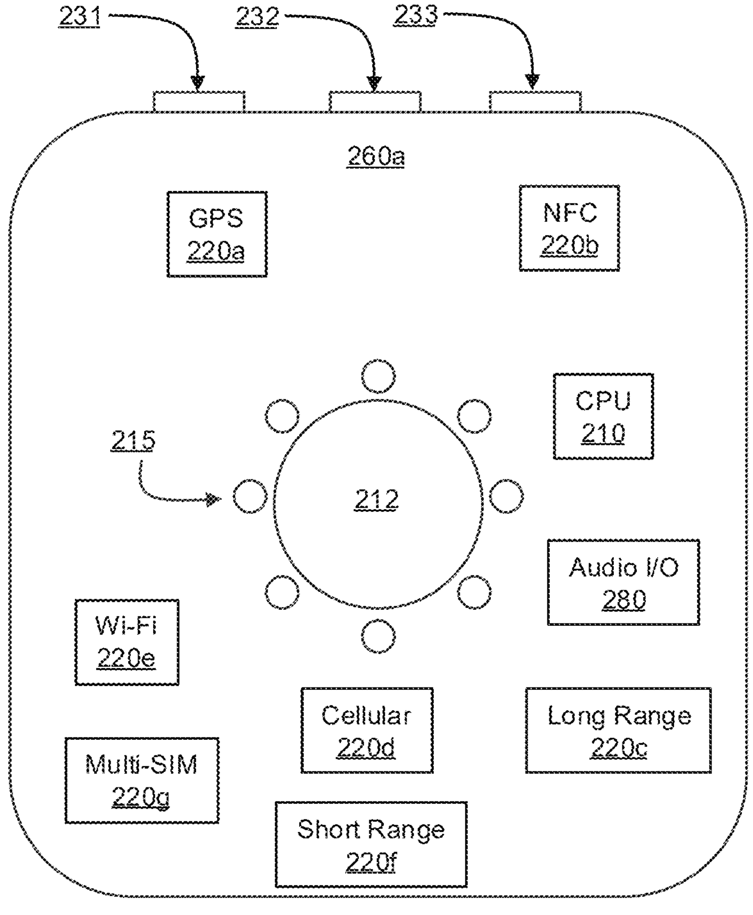
FIG. 2 illustrates an example portable communication device (PCD) and components according to an embodiment.

Referring to FIG. 2, in an embodiment a PCD 260*a* may be a voice interface PCD featuring a voice interface and limited control button 212 such as the Relay® device. In an embodiment, PCD 260*a* may include one or more of several radio interfaces, including a GPS module 220*a*, a near field communication (NFC) device 220*b*, a LoRa transceiver 220*c*, a cellular transceiver 220*d*, a Wi-Fi transceiver 220*e*, and a short-range wireless (e.g., BLUETOOTH) transceiver 220*f*. Cellular transceiver 220*d* may comprise a radio frequency (RF) chipset configured to communicate using a plurality of wireless cellular frequency bands and protocols. Wi-Fi transceiver 220*e* may comprise an RF chipset configured to communicate using one or more of the 802.11 protocols commonly referred to as Wi-Fi. Short range transceiver 220*f* may comprise an RF chipset configured to communicate using the BLUETOOTH or other short range wireless protocol(s). Long-range transceiver 220*c* may comprise an RF chipset configured to communicate using yet another RF communication protocol known as LoRa. LoRa is a physical radio communication protocol ideal for long range wireless applications and long battery life. Audio I/O device 280 may be used for receiving and transmitting audio data via associated hardware (e.g., a microphone and a speaker, included in audio I/O device 280). Multi-SIM 220*g* component may provide dual SIM functionality. Each of PCD 260*a* components 220*a-g*, 280 may be controlled by one or more CPU 210, such as in the form of a microprocessor that communicates with the internal components using a bus (not illustrated in FIG. 2).

In an embodiment, multi-SIM 220*g* component may be provided in one or more forms, for example multi-SIM 220*g* component may comprise a dual SIM dual standby component in which both of two SIMs are active and can be used, e.g., to receive voice communications, but when one SIM is in use, the other becomes inactive. In an embodiment, multi-SIM 220 component may be provided as dual SIM dual active (DSDA) in which two transceivers, e.g., cellular transceiver 220*d*, are provided and each SIM and cellular transceiver may be active at the same time. In an embodiment, multi-SIM 220*g* component may be provided as a single physical device, card or embedded SIM (eSIM), such as a multi-network SIM that permits switching between available networks.

With respect to a user interface, a control button 212 and a plurality of indicator lights 215 are shown. In an embodiment, PCD 260*a* may include one or more physical buttons and/or rocker switches. For example, as shown in FIG. 2, three physical buttons 231, 232, and 233 may be present on the side of the PCD. It should be understood that FIG. 2 is provided for illustrative purposes only and that other interface designs and/or setups may be utilized.

Figure 3:
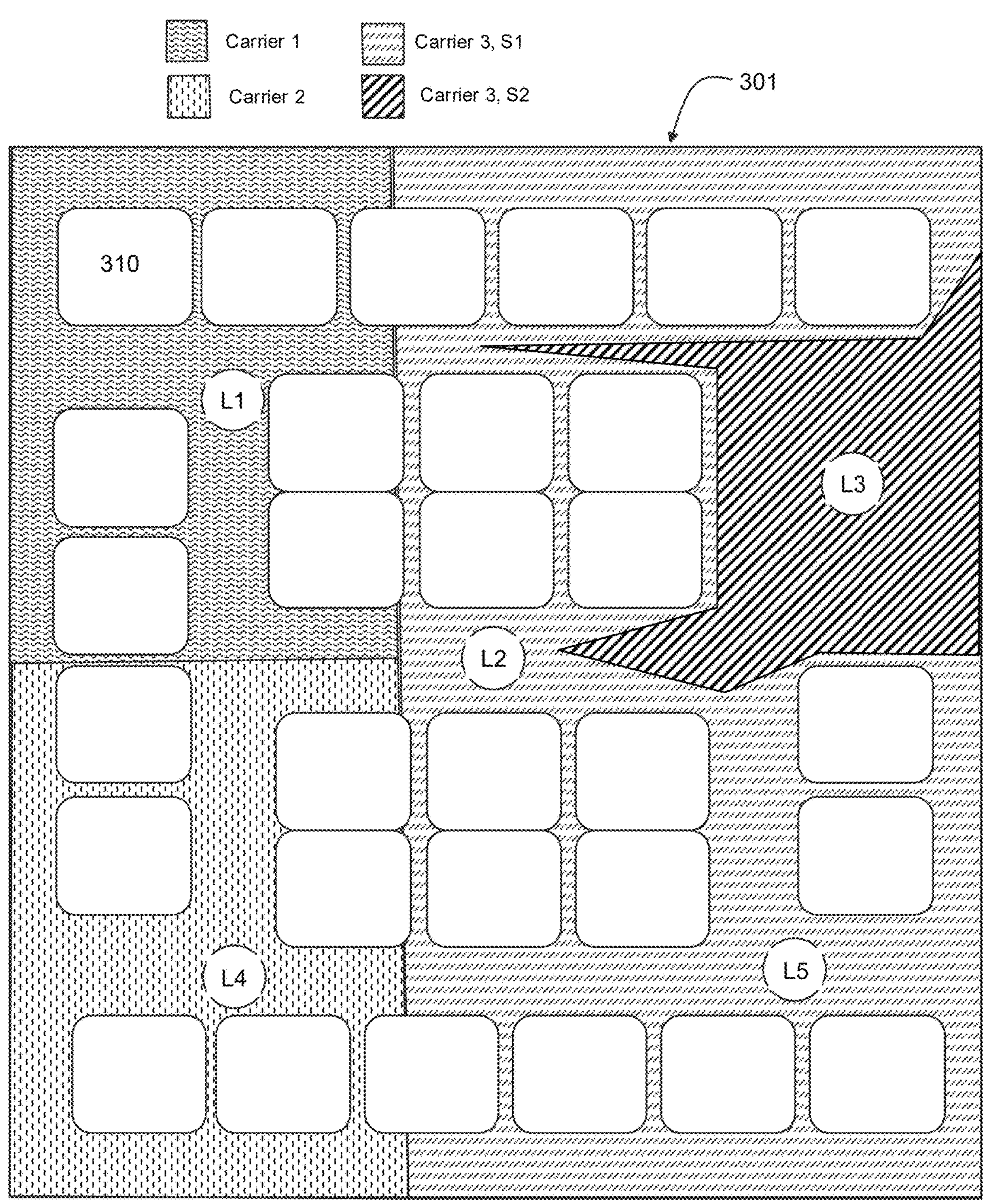
FIG. 3 illustrates an example heatmap of an indoor environment according to an embodiment.

Referring to FIG. 3, an embodiment provides a heatmap 301, an example of which is illustrated in FIG. 3. In an embodiment, a service facilitated by CPS 100 gathers data and forms heatmap 301 for a location. In an embodiment, through normal usage, each PCD connects to a multitude of cellular networks at virtually every location. CPS 100 stores current connectivity data (e.g., carrier, signal strength, time stamp) for every PCD, e.g., PCDs 160*a-g*, connected to CPS 100. The data collected from PCDs may be updated frequently, for example about every ten seconds while PCDs 160*a-g* are connected to CPS 100 in order to perform network handoffs, i.e. switching SIM, if the connectivity between a PCD and an associated base station starts degrading. Historical connectivity data for each carrier may be used with the location's footprint to generate heatmap 301.

Heatmap 301 may comprise data regarding cellular connectivity in a three-dimensional space, for example using a latitude and longitude coordinate system along with an elevation component, each of which may be scaled, e.g., to reflect rooms in a location, elevation by the floor of the building, etc. CPS 100 can associate a signal strength (which may be normalized into a linear scale of 1-5—like bars on a cell phone display) of every carrier with a location to create a heatmap.

As illustrated in FIG. 3, heatmap 301 comprises data indicative of cellular connectivity available in sublocations or positions (indicating by shading in FIG. 3) of location. Features, such as room 310, may be included in a visual presentation of heatmap 301 but may also be omitted from data provided, e.g., to a PCD, or included in another format, as described further herein. For the purpose of illustration, heatmap 301 provides cellular connectivity data for location broken down into 2-dimensional coordinates, with heatmap 301 representing a given elevation or elevation range (e.g., floor of a building).

By way of example, heatmap 301 may represent a geofenced customer premises such as a floor of a building with cubicles or offices, e.g., 310, with heatmap data of all the carriers overlayed thereon. Different shadings in FIG. 3 represent different carriers and/or different signal strengths.

Illustrated points "L1-L5" of FIG. 3 represent a single PCD meandering through the customer premises over time. As the location of the PCD changes it encounters different signal strengths potentially from different carriers which are reported back to CPS or like service to serve as heatmap data for generating heatmap 301. In an embodiment, changing locations from L1 through L5 could trigger a SIM switch, i.e., causing the PCD to activate and/or utilize a different carrier throughout the journey, as further described herein.

The illustration of FIG. 3 is of a single floor (e.g., 3$^{rd}$ floor). Similar heatmaps may be prepared and provided by CPS 100 or obtained by PCDs 160*a-g* for each floor of the customer premises. In an embodiment, heatmap 301 may not be provided as visual data as shown for demonstration purposes in FIG. 3 but rather be provided as machine or human readable document content, for example a data table of individual data points for sublocations, such as one point for each sublocation in the form of a grid, room, etc. In an embodiment, each data point may be comprised of four (4) essential pieces of information as in the following example:

Data Point 1

{
LOC 1: lat-long
LOC 2: floor
Carrier ID: Verizon
Signal Strength: −40 dBm
}

In an embodiment, cellular signal strength is measured in dBm (decibel-milliwatts). A higher dBm value indicates a stronger signal, with values closer to zero representing better signal quality. Typical signal strength ranges from −30 dBm to −110 dBm. In an embodiment, a range of dBm may be converted to "bars" or similar summary statistic, e.g., for illustrative purposes. Further, the data may be timestamped to indicate its relevance to a current heatmap generation or PCD connectivity and SIM switching scenario.

Heatmap 301, e.g., for geofenced area 101, may be downloaded to each PCD, e.g., on entry of geofenced area 101. Data of heatmap 301 may contain each carrier's historical signal strength at each sublocation within geofenced area 301. Data of heatmap 301 may change over time as more historical data gets added. For example, heatmap 301 may be biased to weight newer data greater than older data using an update technique, e.g., based on timestamps included with cellular network connectivity data reports provided via PCDs. For example, in an embodiment data older than 30 days or another adjustable time threshold may be removed altogether. In an embodiment, each time a PCD is connected to CPS 100 over a network, PCD may download the heatmap, which may include downloading data to update an existing heatmap. In an embodiment, the PCD thereafter determines its own location (based on one or more techniques) and consults the heatmap to determine which cellular carrier offers the best connectivity.

In an embodiment a PCD may determine its location within an area, e.g., geofenced area 101, using a variety of techniques. For example, in areas where a beaconing system is available, a PCD may utilize beacon data to determine its location. In an embodiment, a PCD may be provided with environmental data comprising a wireless fingerprint of the location that can be used to accurately locate the PCD within a given area without requiring a location beacon system, for example by matching sensed network connectivity devices with the fingerprint data in a location odometry process.

Figure 4:
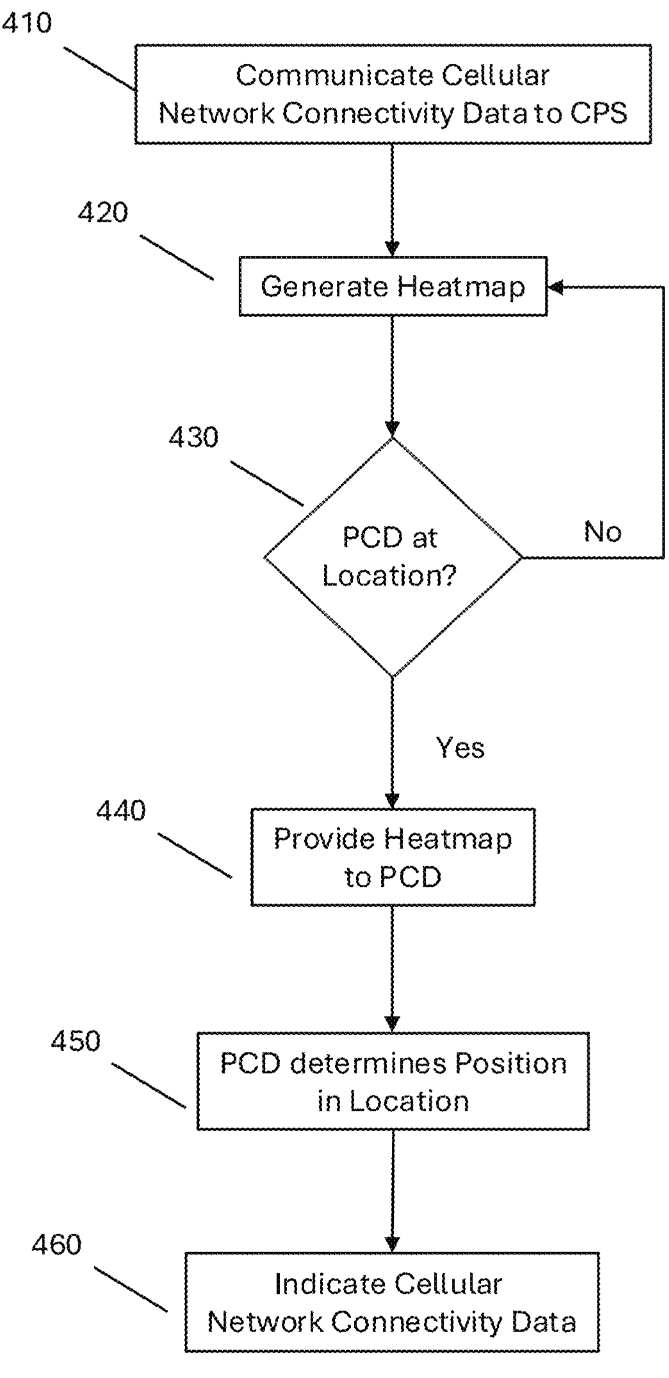
FIG. 4 illustrates an example method of generating and using a heatmap according to an embodiment.

As illustrated in the example of FIG. 4 at 410, an embodiment provides a method of communicating cellular connectivity data from a PCD to CPS 100. For example, this communicating may take place as a background task of PCD, e.g., as it traverses through an area such as a geofenced area 101 of FIG. 1 to various locations, as illustrated at L1-L5 of FIG. 3. As with the data provided in heatmap 301, data transmitted by PCD to CPS 100 may include elements comprising a two-dimensional (2D) location indicator such as latitude and longitude (which may be relative, for example based on a location odometry process), an elevation indicator (e.g., as sensed via a pressure sensor, beacon system, etc.), a cellular carrier identification (or a plurality thereof) and signal strength data for the carrier or plurality thereof, e.g., sensed via PCD for the sublocation.

As illustrated at 420, a heatmap is generated for example by CPS 100. In an embodiment, the collective data of various PCDs reporting cellular network connectivity data are used to form a heatmap. Thus, heatmap 301 may comprise smoothed or statistically averaged data of many PCDs reporting on the area over a period. In an embodiment, the shapes of heatmap 301 may change and improve with time, i.e., shaded areas indicative of carriers and/or signal strength may be refined from generalized shapes (e.g., blocks, circles, etc.) to highly refined boundaries that are known or inferred from a plurality of PCDs reporting cellular network connectivity data from the area over time.

For example, referring to FIG. 3, an initial set of available cellular connectivity data from one or more PCDs is clustered or sorted into defined locations, such as large areas illustrated for Carrier 1, Carrier 2, and Carrier 3, strength 1 (S1). In the example, different areas or grids of a location such as geofenced area 101 may include clusters of data points reported by PCDs, which are used to center geometric shapes (rectangles, circles, etc.) of predetermined size for subareas in a heatmap. The shape and size of a subarea may thereafter be refined as more data points are received from PCDs. For example, an initial shape of FIG. 3, e.g., Carrier 3, S1 that covers a large part of the location or geofenced area 101 may be refined or augmented to a different shape, e.g., Carrier 3, S2 when more data is received from PCDs indicative of better or stronger coverage in a given subarea. For example, an initial heatmap may include only the data for Carrier 3, S1, whereas an updated heatmap may add data for Carrier 3, S2 given that more PCD connectivity data has been reported, allowing interpolation or inferencing to be applied to draw the resultant shape illustrated for Carrier 3, S2. As may be appreciated, additional features may be represented in heatmap 301 and its data, e.g., connectivity map data customized per device type, time of day, user profile role associated with a receiving PCD, etc.

If a PCD enters a geofenced area or location, as indicated by the determination at 430, an embodiment may provide a heatmap to the PCD. It is noted that a heatmap may be provided responsively as downloading a heatmap, e.g., from CPS 100, or by activating or unlocking a heatmap already stored at PCD, etc. By way of example, a PCD may be provided with heatmap data responsive to a determination, such as through nearfield and radio frequency identification (RFID) communication, that PCD has entered an area associated with the heatmap and is proximate to an authorized user of a given user profile allowed to use certain networks.

Thereafter, PCD determines its location within area as indicated at 450. For example, a beacon system, if available, may be used to determine relative location within an area. In an embodiment, where no beacon system is available, a local determination based on an environmental map of wireless signal fingerprints may be utilized. In any case, having the location within the area determined, PCD may relate this to the heatmap data indicative of a historical cellular network connectivity for the sub area or location within area 101, and be provided with an indication of a cellular connectivity data, such as the strongest cellular network signal available for the location, indicated at 460. For example, the indication of cellular network connectivity data may include a current "best" cellular network, such as one offering (historically) the best signal strength for the location determined at 450. In an embodiment, the indication of cellular connectivity data at 460 may be a proactive hint as to which cellular network will be the best, e.g., based on a direction of travel for example as determined via a compass or other sensor of PCD, extrapolating a path based on prior location points, speed, etc. A current best cellular network indication may be maintained, e.g., in memory of the PCD, for use if and when a distance or SIM switching threshold is encountered, e.g., the PCD is leaving a current area of network coverage and will be entering a new area of network coverage, as illustrated in FIG. 3 by the transition for L1 to L2 or L3. In an embodiment, as further described herein, the indicating can be provided to an end user, e.g., as a visual or audible hint or clue as to which cellular network is best, which will be best based on direction of travel, instructions or guidance to a better area for network connectivity, instructions or guidance to a better area for placing a local cellular access device, or a visual of the heatmap such as illustrated in FIG. 3.

Figure 5:
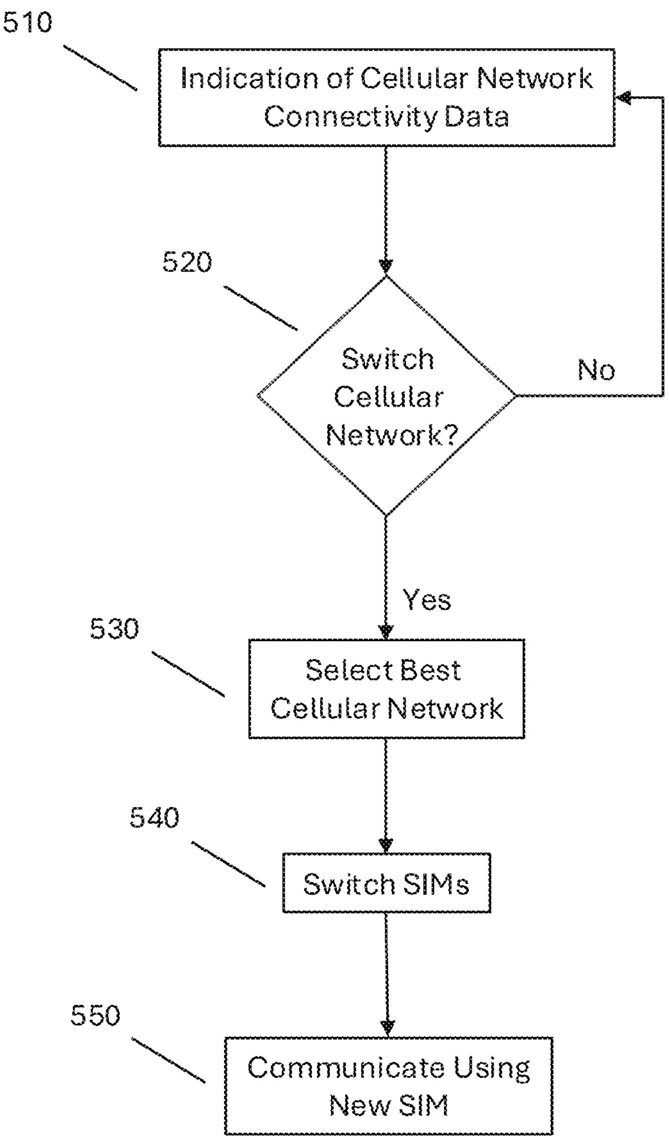
FIG. 5 illustrates an example method of location-based SIM switching according to an embodiment.

Referring to FIG. 5, an embodiment may use an indication of cellular network connectivity data to perform SIM switching. As described herein, a PCD, e.g., PCD 160*f*, connects over a wireless network and through a backhaul network to CPS 100. CPS 100 authenticates the PCD and provides data according to permissions based on the contents of a user profile associated with the PCD. For example, a given PCD 160*f* may be associated with a user profile of a user currently operating PCD 160*f*. This along with other data, e.g., PCD 160*f* has entered geofenced area 101, may indicate that certain heatmap data is applicable and should be provided to PCD 160*f*.

In an embodiment, CPS 100 downloads an updated cellular connectivity heatmap to the PCD. The cellular connectivity heatmap comprises data associating cellular carrier signal strengths for multiple cellular carriers for specific locations or positions within the area, e.g., premises of a customer. The PCD compares current signal strength against the signal strength in the heatmap for the current location and position and uses the indication of cellular connectivity data generated at 510 to perform SIM management by determining if a switch of cellular network is needed as indicated at 520. For example, if the PCD is already connected to the cellular carrier providing the best signal strength, no further action need be taken unless conditions change (e.g., the PCD moves to a new location, a cellular network carrier becomes unavailable, etc.). If the PCD is not connected to the cellular carrier providing the best signal strength, as determined at 520, the best cellular network is selected as indicated at 530. PCD performs a switch of SIM, as indicated at 540, to utilize the carrier that is providing the best signal strength, as indicated at 550. In an embodiment, SIM management may include changing which cellular network is active and used for communication, which SIM is active and placed in standby mode, etc. In an embodiment, SIM management such as outlined at 510 through 550 or parts thereof may be repeated according to a schedule, such as every ten seconds (or other fixed time) or whenever conditions change (e.g., dynamically according to location changes, new heatmap data becoming available, etc.).

In an embodiment, the indication of cellular network connectivity data provided at 510 comprises recommending a switch to a cellular network based on the heatmap and the current position, which may include indicating a SIM of the PCD to use for communicating data over a cellular network.

In an embodiment, the indication of cellular network connectivity provided at 510 may include proactive recommendations, e.g., switching is to be performed proactively based on the direction of movement. For example, if the PCD determines it is approaching a location where a switch of SIM is needed, the PCD may perform a SIM switch in anticipation of maintaining best connectivity. This permits an embodiment to anticipate poor connectivity and SIM-switch before the cellular signal starts to degrade.

Therefore, an embodiment provides a method for providing optimized cellular connectivity for a PCD in communication with a cloud-based CPS. In an embodiment the method comprises connecting a PCD via a wireless network and through a backhaul network to a CPS and authenticating the PCD via the CPS. In an embodiment, the CPS configures the PCD based on a user profile associated with the PCD. In an embodiment, the method includes downloading, from the CPS to the PCD, an updated cellular connectivity heatmap, the heatmap comprising data associating cellular carrier signal strengths for multiple cellular carriers with specific locations of a customer's premises. In an embodiment the method includes determining a current location of the PCD and consulting the downloaded cellular connectivity heatmap to determine which cellular carrier offers the best connectivity at the determined current location. In an embodiment, the method includes comparing a current signal strength of a currently connected cellular carrier against a signal strength in the heatmap for the determined current location and performing a SIM switch to utilize the cellular carrier providing the best signal strength determined from the heatmap if the PCD is not currently connected to that carrier. In an embodiment, the method includes periodically or intermittently repeating the steps of determining the current location, consulting the heatmap, comparing signal strengths, and performing a SIM switch if necessary. An embodiment optionally includes performing a SIM-switch in anticipation of maintaining best connectivity if the PCD determines it is approaching a SIM-switch threshold based on location and heading.

Figure 6:
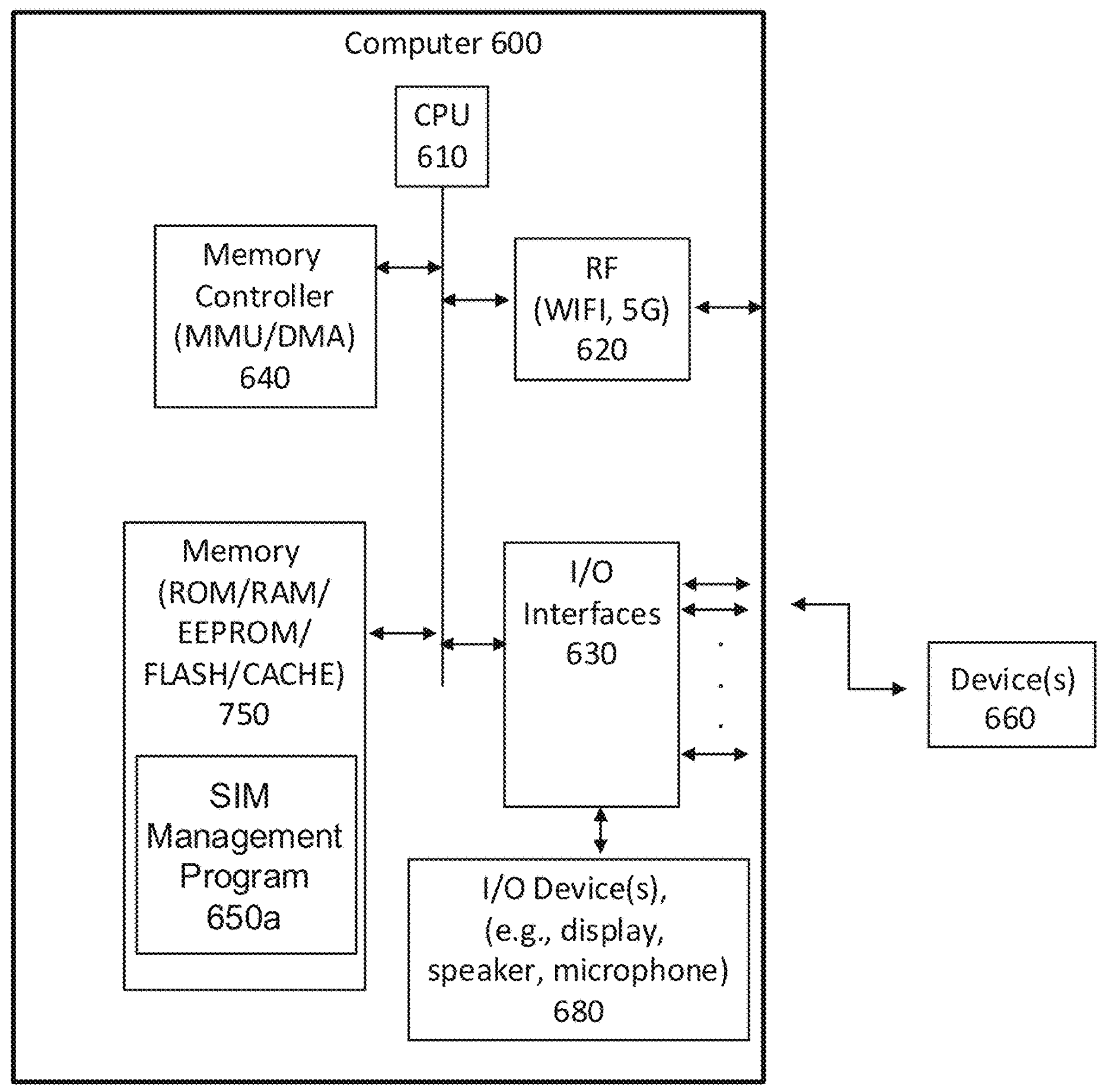
FIG. 6 illustrates an example system and components according to an embodiment.

Referring to FIG. 6, it will be readily understood that certain embodiments can be implemented using any of a wide variety of devices or combinations of devices and components. In FIG. 6 an example of a computer 600 and its components are illustrated, which may be used in a device such as CPS 100 or PCDs 160*a*-160*g* for implementing certain of the functions or acts described herein, embodied in SIM management program 650*a*, in turn implementing acts or subsets thereof. Also, circuitry other than that illustrated in FIG. 6 may be utilized in one or more embodiments. The example of FIG. 6 includes certain functional blocks, as illustrated, which may be integrated onto a single semiconductor chip to meet specific application requirements.

One or more processing units are provided, which may include a central processing unit (CPU) 610, one or more graphics processing units (GPUs), and/or micro-processing units (MPUs), which include an arithmetic logic unit (ALU) that performs arithmetic and logic operations, instruction decoder that decodes instructions and provides information to a timing and control unit, as well as registers for temporary data storage. CPU 610 may comprise a single integrated circuit comprising several units, the design and arrangement of which vary according to the architecture chosen.

Computer 600 also includes a memory controller 640, e.g., comprising a direct memory access (DMA) controller to transfer data between memory 650 and hardware peripherals. Memory controller 640 includes a memory management unit (MMU) that functions to handle cache control, memory protection, and virtual memory. Computer 600 may include controllers for communication using various communication protocols (e.g., $I^2C$, USB, etc.).

Memory 650 may include a variety of memory types, volatile and nonvolatile, e.g., read only memory (ROM), random access memory (RAM), electrically erasable programmable read only memory (EEPROM), Flash memory, and cache memory. Memory 650 may include embedded programs, code, and software, e.g., SIM management program 650*a*, that provides coded methods such as illustrated and described in connection with the remaining figures. By way of example, and not limitation, memory 650 may also include an operating system, application programs, other program modules, code, and program data, which may be downloaded, updated, or modified via remote devices.

A system bus permits communication between various components of the computer 600. I/O interfaces 630 and radio frequency (RF) devices 620, e.g., Wi-Fi and telecommunication radios, near field communication modules, etc., may be included to permit computer 600 to send data to and receive data from remote devices using wireless mechanisms, noting that data exchange interfaces for wired data exchange may be utilized. Computer 600 may operate in a networked or distributed environment using logical connections to one or more other remote computers or devices 660, for example in a system comprising a CPS or a set of PCDs. The logical connections may include a network, such local area network (LAN) or a wide area network (WAN) but may also include other networks/buses. For example, computer 600 may communicate data with and between device(s) 660 using the Internet.

Computer 600 may therefore execute program instructions or code configured to provide CPS and/or PCD functionality and perform other functionality of the embodiments. A user can interface with (for example, enter commands and information) the computer 600 through input devices, which may be connected to I/O interfaces 630. A display or other type of I/O device 680 may be connected to or integrated with the computer 600, for example via an interface selected from I/O interfaces 630.

It should be noted that the various functions described herein may be implemented using instructions or code stored on a memory, e.g., memory 650, that are transmitted to and executed by a processor, e.g., CPU 610. Computer 600 includes one or more storage devices that persistently store programs and other data. A storage device or computer readable medium, as used herein, is a non-transitory computer readable medium. Some examples of a non-transitory computer readable medium include, but are not limited to, storage integral to computer 600, such as memory 650, a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections using a mobile network, or through a hard wire connection, such as over a USB connection.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method, comprising:

obtaining, at a portable communication device (PCD), a heatmap comprising historical cellular network connectivity data for a plurality of cellular networks for a plurality of positions in a location, wherein the heatmap is downloaded to the PCD from a communication platform server (CPS) and comprises crowdsourced connectivity data reported by a plurality of PCDs operating in the location;

determining, by the PCD, a current position in the location;

indicating, at the PCD, cellular network connectivity data based on the current position and the heatmap; and performing a subscriber identification module (SIM) switch at the PCD to utilize a cellular carrier identified by the heatmap as providing best connectivity at the current position, based on the indicating.

2. The method of claim 1, wherein the indicating cellular network connectivity data comprises recommending a switch to a cellular network based on a comparison of signal strengths of a plurality of cellular carriers at the current position as recorded in the heatmap.

3. The method of claim 1, wherein the indicating cellular network connectivity data comprises indicating a subscriber identification module (SIM) of the PCD to use for communicating data over a cellular network, wherein the SIM is identified based on the heatmap indicating that the cellular carrier associated with the SIM provides strongest signal strength at the current position.

4. The method of claim 3, wherein:

the PCD comprises a plurality of SIMs, each connecting to a different cellular network carrier; the method comprising automatically switching between the plurality of SIMs based on the indicating, wherein the switching is triggered without user intervention in response to the heatmap indicating a different cellular carrier provides better connectivity at the current position.

5. The method of claim 4, comprising determining a direction of movement of the PCD, wherein the switching is performed proactively, before a signal of a current SIM degrades, based on the direction of movement and the heatmap indicating that a different cellular carrier provides better connectivity at a predicted future position along the direction of movement.

6. The method of claim 3, wherein the PCD communicates by default using an access point to a wireless internet connection; the method comprising switching from the access point to the SIM based on the indicating.

7. The method of claim 1, comprising communicating, from the PCD to a communication platform server (CPS), cellular network connectivity data, wherein the communicated data comprises at least a current carrier identification, signal strength, and position of the PCD, and is used by the CPS to update the heatmap.

8. The method of claim 7, wherein the communicating is performed as a background task.

9. The method of claim 1, wherein the indicating comprises providing a visual indication of cellular connectivity at the PCD.

10. The method of claim 1, wherein the heatmap comprises, for a plurality of sublocations at the location, a two-dimensional (2D) location indicator, an elevation indicator, a cellular carrier identification, and signal strength data, and wherein the heatmap data for each sublocation is aggregated from reports of a plurality of PCDs at the sublocation over time.

11. A system comprising:

a set of one or more processors; and a non-transitory storage medium comprising code executable by the set of one or more processors, the code being configurable for:

obtaining, at a portable communication device (PCD), a heatmap comprising historical cellular network connectivity data for a plurality of cellular networks for a plurality of positions in a location, wherein the heatmap is downloaded to the PCD from a communication platform server (CPS) and comprises crowdsourced connectivity data reported by a plurality of PCDs operating in the location;

determining, by the PCD, a current position in the location;

indicating, at the PCD, cellular network connectivity data based on the current position and the heatmap; and performing a subscriber identification module (SIM) switch at the PCD to utilize a cellular carrier identified by the heatmap as providing best connectivity at the current position, based on the indicating.

12. The system of claim 11, wherein the indicating cellular network connectivity data comprises recommending a switch to a cellular network based on the heatmap and the current position based on a comparison of signal strengths of a plurality of cellular carriers at the current position as recorded in the heatmap.

13. The system of claim 11, wherein the indicating cellular network connectivity data comprises indicating a subscriber identification module (SIM) of the PCD to use for communicating data over a cellular network, wherein the SIM is identified based on the heatmap indicating that the cellular carrier associated with the SIM provides strongest signal strength at the current position.

14. The system of claim 13, wherein:

the PCD comprises a plurality of SIMs, each connecting to a different cellular network carrier; the code being configurable for automatically switching between the plurality of SIMs based on the indicating, wherein the switching is triggered without user intervention in response to the heatmap indicating a different cellular carrier provides better connectivity at the current position.

15. The system of claim 14, comprising determining a direction of movement of the PCD, wherein the switching is performed proactively, before a signal of a current SIM degrades, based on the direction of movement and the heatmap indicating that a different cellular carrier provides better connectivity at a predicted future position along the direction of movement.

16. The system of claim 13, wherein the PCD communicates by default using an access point to a wireless internet connection; the code being configurable for switching from the access point to the SIM based on the indicating.

17. The system of claim 11, comprising code being configurable for communicating, from the PCD to a communication platform server (CPS), cellular network connectivity data, wherein the communicated data comprises at least a current carrier identification, signal strength, and position of the PCD, and is used by the CPS to update the heatmap.

18. The system of claim 17, wherein the communicating is performed as a background task.

19. The system of claim 11, wherein the indicating comprises providing a visual indication of cellular connectivity at the PCD.

20. A computer program product, comprising:

a non-transitory storage medium comprising code executable by a set of one or more processors, the code being configurable for:

obtaining, at a portable communication device (PCD), a heatmap comprising historical cellular network connectivity data for a plurality of cellular networks for a plurality of positions in a location, wherein the heatmap is downloaded to the PCD from a communication platform server (CPS) and comprises crowdsourced connectivity data reported by a plurality of PCDs operating in the location;

determining, by the PCD, a current position in the location;

indicating, at the PCD, cellular network connectivity data based on the current position and the heatmap; and performing a subscriber identification module (SIM) switch at the PCD to utilize a cellular carrier identified by the heatmap as providing best connectivity at the current position, based on the indicating.

* * * * *